C. W. KIBBEY.
CHEESE STAND.
APPLICATION FILED MAY 22, 1913.
1,091,143.  Patented Mar. 24, 1914.
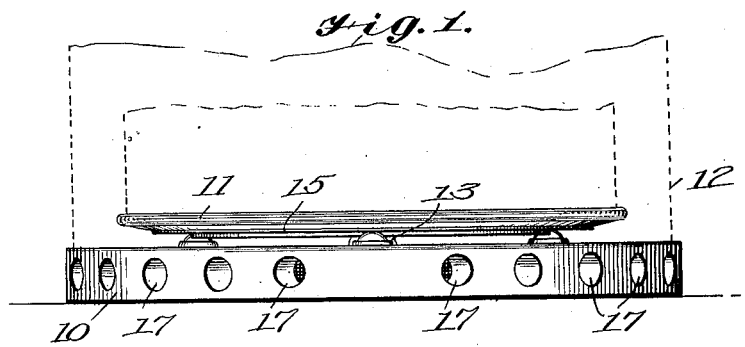
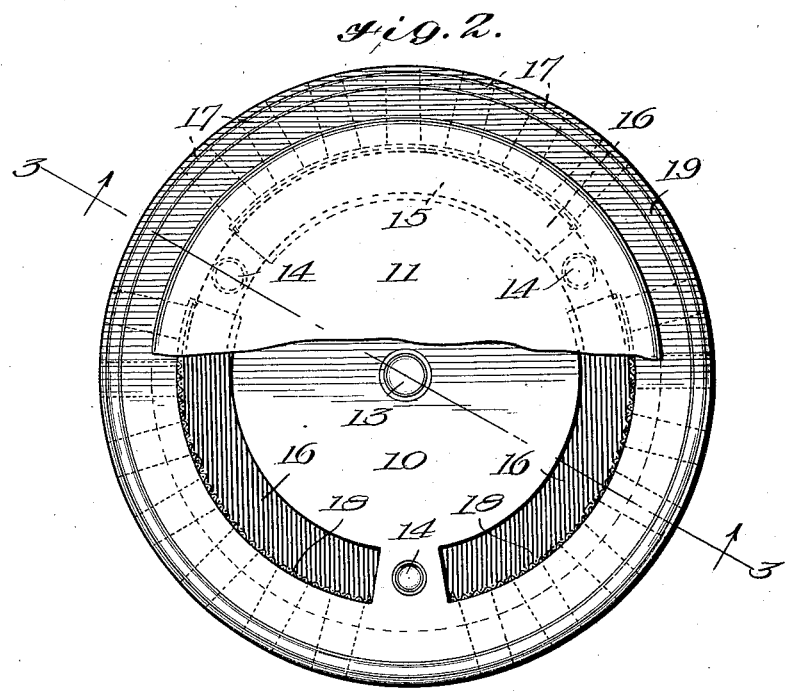
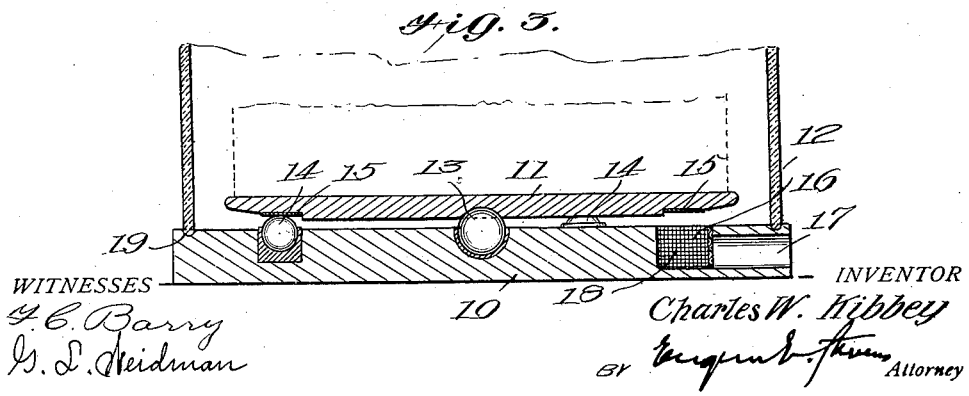
WITNESSES
Y. C. Barry
G. L. Weidman
INVENTOR
Charles W. Kibbey
BY
Attorney

UNITED STATES PATENT OFFICE.

CHARLES W. KIBBEY, OF BOYNE CITY, MICHIGAN.

CHEESE-STAND.

1,091,143.  Specification of Letters Patent. Patented Mar. 24, 1914.

Application filed May 22, 1913. Serial No. 769,293.

*To all whom it may concern:*

Be it known that I, CHARLES W. KIBBEY, a citizen of the United States, residing at Boyne City, in the county of Charlevoix and State of Michigan, have invented certain new and useful Improvements in Cheese-Stands, of which the following is a specification.

This invention relates to stands for displaying cheese, and its object is to provide a device of this kind which is sanitary in every respect, means being provided for excluding flies and other insects. The device is also constructed to allow a free circulation of air around the cheese, although the latter is completely covered.

The invention also has for its object to provide a cheese stand which is simple in construction, and which has its parts so arranged that they may be separated and readily cleaned.

With these objects in view, the invention consists in a novel combination and arrangement of parts to be hereinafter described and claimed, reference being had to the accompanying drawing, in which—

Figure 1 is an elevation of the stand. Fig. 2 is a plan view of the stand, the turning table being shown partly broken away. Fig. 3 is a cross section on the line 3—3 of Fig. 2.

Referring specifically to the drawing, the stand comprises a base 10 which supports a turntable 11 on which cheese is placed and covered by the usual glass cover 12, the latter forming no part of the present invention. The base 10 is a circular plate having at the center a spherical pivot bearing 13 for the turntable 11, the latter having on its under side, at the center, a socket to receive the pivot. The turntable is a circular disk, and it is separable from the base, so that the parts are readily accessible for cleaning purposes. The top of the base has seats for caster balls 14 which engage an annular metal strip 15 secured to the under side of the turntable, near the edge thereof. These casters prevent the turntable from tilting and they also permit the same to be freely revolved. That portion of the turntable which carries the strip 15 is reduced in thickness, but the top of the turntable, on which cheese is placed, is perfectly flat.

In the top of the base 10 are segmental recesses 16 into which open apertures 17 made in the edge of the base. The ends of the apertures which open into the recesses are covered with a screen 18. The turntable 11 is spaced a short distance from the top of the base and its diameter is less than the diameter of the base, thus leaving a marginal portion uncovered so that the glass cover 12 may be supported thereon. When the cover is in place, the cheese is entirely inclosed and protected from dust, flies, etc. Near its edge the base has an annular groove 19 in which the bottom edge of the cover seats. The apertures 17 and recesses 16 allow air to pass into the cover 12 and circulate around the cheese, flies and other insects being excluded by the screens 18. The apertures are beneath the turntable 11, but as the latter is spaced from the base 10, air can enter the cover. The recesses, of course, are in that portion of the base over which the cover extends.

The device herein described can be easily and cheaply manufactured, and it provides a perfectly sanitary display stand, which can be readily taken apart and cleaned.

I claim:

A cheese stand comprising a base plate having recesses extending partly therethrough from the top thereof and apertures leading from the edge of the plate to said top recesses, and a turntable mounted on said base plate and spaced from the top thereof, the diameter of the turntable being less than the diameter of the base plate, and the aforesaid top recesses of the base plate being located beneath the turntable.

In testimony whereof I affix my signature in presence of two witnesses.

CHARLES W. KIBBEY.

Witnesses:
J. L. EKSTROM,
SABIN HOOPER.